N. C. BASSETT.
BALANCING MACHINE.
APPLICATION FILED DEC. 17, 1906.
953,811.
Patented Apr. 5, 1910.
3 SHEETS—SHEET 1.
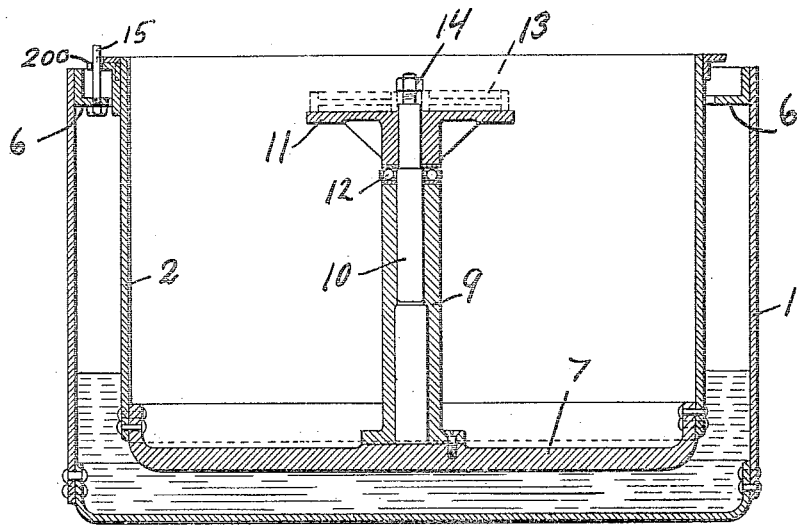
Fig. I.
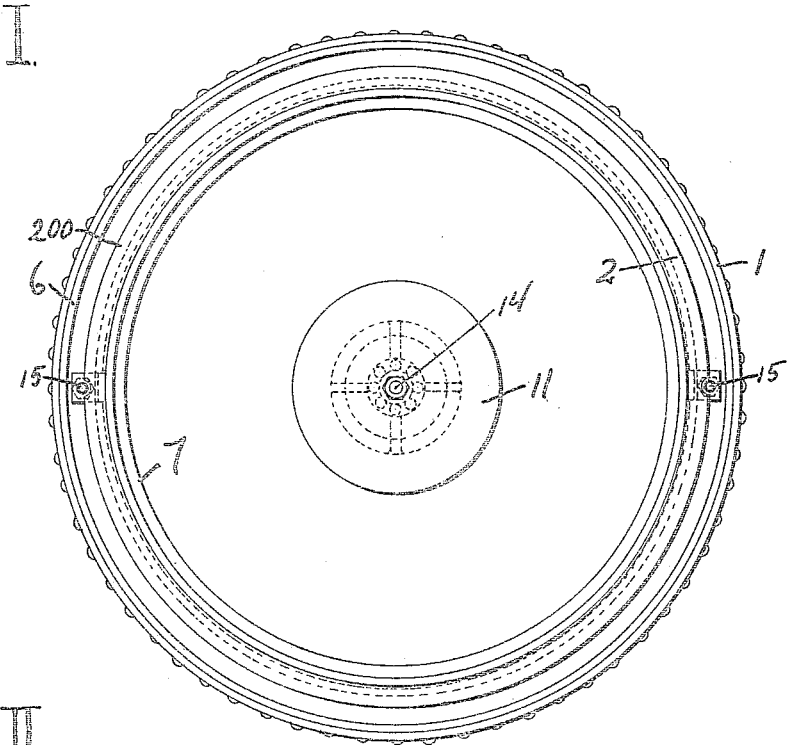
Fig. II.
WITNESSES:
Frank E. Dennett
John C. Rennie
N. C. Bassett INVENTOR
BY
ATTORNEY.

N. C. BASSETT.
BALANCING MACHINE.
APPLICATION FILED DEC. 17, 1906.
953,811.
Patented Apr. 5, 1910.
3 SHEETS—SHEET 2.
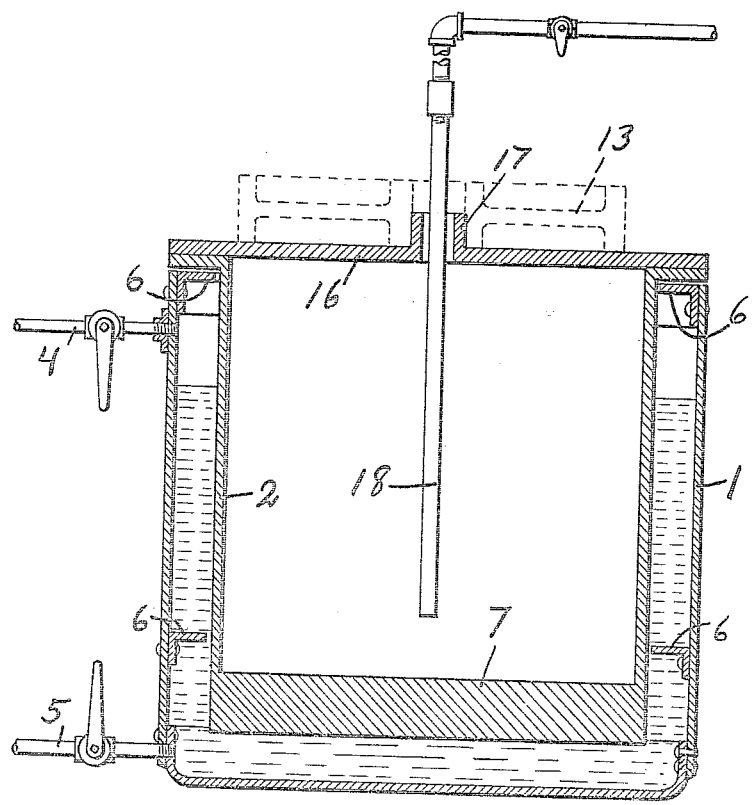
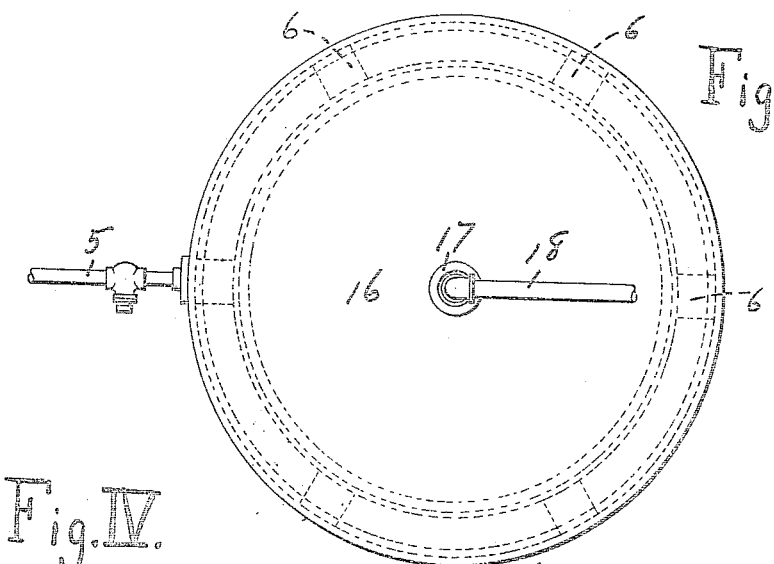
Fig. III.
Fig. IV.
WITNESSES:
Frank E. Dennett
John C. Rennie
N. C. Bassett INVENTOR
BY
ATTORNEY.

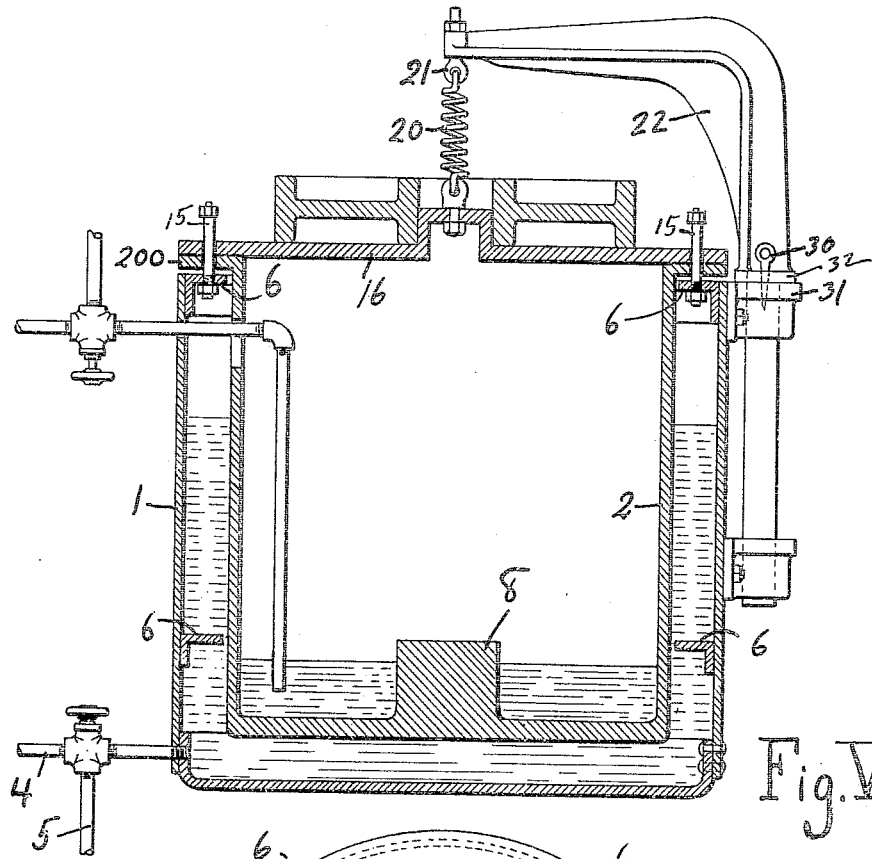
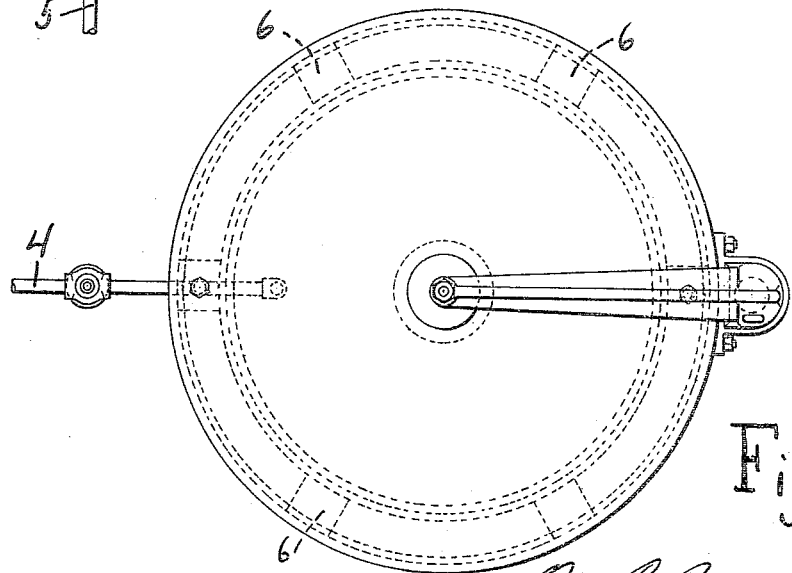

UNITED STATES PATENT OFFICE.

NORMAN C. BASSETT, OF MILWAUKEE, WISCONSIN, ASSIGNOR TO ALLIS-CHALMERS COMPANY, OF MILWAUKEE, WISCONSIN, A CORPORATION OF NEW JERSEY.

BALANCING-MACHINE.

953,811.      Specification of Letters Patent.      Patented Apr. 5, 1910.

Application filed December 17, 1906. Serial No. 348,152.

*To all whom it may concern:*

Be it known that I, NORMAN C. BASSETT, a citizen of the United States, residing at Milwaukee, in the county of Milwaukee and State of Wisconsin, have invented a certain new and useful Balancing-Machine, of which the following is a specification.

This invention relates to balancing machines or devices by which the difference in weight between one part of a body and another part of said body with respect to an axis may be determined.

It is desirable especially in the manufacture of bodies which are intended to be rapidly rotated, to have means for readily ascertaining which side of the body is the heavier, or, what amounts to the same thing, to find which side of the body is the lighter and how much material must be added to that side of the body, or how much material must be removed from the other side of the body to insure that the body is balanced with respect to its axis of rotation, for example.

This invention provides a simple and convenient form of apparatus for this purpose.

In the drawings which accompany this specification and which disclose an embodiment of this invention, and on which the same reference characters are used to designate the same elements in each of the several views,—

Figure 1 is a vertical section through an apparatus embodying this invention. Fig. 2 is a plan view of the apparatus disclosed by Fig. 1. Fig. 3 is a vertical section of an alternative construction. Fig. 4 is a plan view of the apparatus shown by Fig. 3. Fig. 5 is a vertical section of a second alternative form of apparatus; and Fig. 6 is a plan view of the apparatus as shown by Fig. 5.

Referring to the drawings, the numeral 1 designates a tank adapted to contain a fluid, as, for example, water; and the numeral 2 designates a tank or float adapted to be supported by the water contained in tank 1. Pipes may be arranged provided with suitable valves for supplying water to and withdrawing water by pumps or other means from the tank 1, such pipes being designated by the numerals 4 and 5.

The numeral 6 designates guides secured to the tank 1, which guides serve to locate the tank 2 and also to prevent said tank 2 from being thrown to any great extent out of a perpendicular position. The tank 2 is also provided with a flange 200, through apertures in which bolts or other similar devices may be passed to serve to retain the parts in proper alinement. The tank 2 is weighted or ballasted, as by being provided with a heavy bottom 7, as shown by Figs. 1 and 3, or by providing the bottom with a weighted portion 8, as shown by Fig. 5.

In Fig. 1 is shown a standard 9 fastened to the bottom of the tank 2 and within this standard is a shaft 10, the shaft and standard being disposed in a vertical position normally and revoluble with shaft 10, and supported by the standard 9 is the turntable 11. Any suitable or preferred antifriction devices, such for example, as the antifriction balls 12, may be placed between the standard 9 and the turntable 11.

The operation of this apparatus is as follows: A pulley 13, for example, is placed upon the turntable 11 and centered with respect to the shaft 10; is clamped to the turntable by the nut 14, engaged with the screw-threaded extremity of the shaft 10. The turntable, shaft 10 and tank 2 will tip down at that side on which is located the heavier side of the pulley 13.

The principle of operation of this apparatus is the same as though a weight were placed in a boat or on a vessel; the vessel, or the tank in this instance, will heel over at that side which supports the excess of weight.

The extent of heeling with the apparatus shown by Fig. 1 may be readily determined by the position which the flange 200 takes with respect to the bolts 15.

The apparatus shown by Fig. 3 is similar in all essential features to the apparatus shown by Fig. 1 except that in this apparatus the tank 2 is provided with a deck 16 upon which the article, as the pulley 13, is adapted to be placed, and this deck is provided with a centrally located, upstanding, apertured boss 17, which serves as a ready means for centering the pulley 13 with respect to the tank and the aperture in the boss permits the entrance into the tank 2 of a pipe 18 through which water may be admitted to the interior of said tank 2, or withdrawn therefrom by a pump or other suitable apparatus. With this form of apparatus, by admitting water to or withdrawing it from the interior of tank 2, or by varying the water level in tank 1, or by varying the water level in both the tanks 1 and 2, the sensitiveness of the apparatus to indicate differences of weight is increased or decreased.

The apparatus shown by Fig. 5 is in essential particulars a duplicate of the two forms of apparatus already described, and the principle of operation is the same except that a spring 20 is secured by one end to the deck 16 of the tank 2 and is supported at its other end by a bolt 21 which is adjustably secured to a crane 22 rotatably secured to one side of the tank 1, or to any convenient support. In the use of this form of the apparatus, water may be admitted to or withdrawn from the interior of the tank 2, the water level in the tank 1 may be varied, and in addition the tension of the spring 20 may be varied by means of the bolt and nut 21, which operations tend to increase or decrease the sensitiveness of the device, the sensitiveness being increased the higher out of the water in the tank 1 the tank 2 floats, and vice versa.

The numeral 30 designates a pin which may be passed through apertures in the flange 32 of the crane and the flange 31 of one of the supports of the crane to hold the crane in a predetermined position.

As stated heretofore, the principle of operation of the several forms of apparatus shown by the drawings is the same as that governing a loaded boat or vessel. If the load is not symmetrically placed, the boat or tank will tip and the crankiness or sensitiveness will depend, for the forms of tanks shown, upon the freeboard of the tank when supporting the weight, such, for example, as the pulley 13.

What I claim is,—

1. The combination with a tank adapted to contain a fluid, of a float adapted to be supported by the fluid within said tank, said float having means to center an object with respect thereto, and said float being provided with means to admit fluid thereto and to permit its withdrawal therefrom, and means adapted to resist the immersion of said float in the fluid contained in said tank.

2. The combination with a tank adapted to contain a fluid, of a float adapted to be supported by the fluid within said tank, said float having means rotatable thereon for supporting above the center of buoyancy of said float a body to be investigated.

3. The combination with a tank adapted to contain a fluid, of a float adapted to be supported by the fluid within said tank, said float having means to center an object with respect thereto, and said float being provided with means to admit fluid thereto and to permit its withdrawal therefrom, and means adapted to resist the immersion of said float in the fluid contained in said tank, said tank being provided with means to guide said float.

4. The combination with a tank adapted to contain a fluid, of a ballasted float adapted to be supported by the fluid within said tank, said float being provided with means to center an object with respect thereto, and said tank being provided with means to center said float with respect to said tank, both tank and float being provided with means to admit fluid thereto and to permit its withdrawal therefrom.

5. The combination with a tank adapted to contain a fluid, of a ballasted float adapted to be supported by the fluid within said tank, said float being provided with means to center an object with respect thereto, and said tank being provided with means to center said float with respect to said tank, and means adapted to resist the immersion of said float in the fluid contained in said tank, both tank and float being provided with means to admit fluid thereto and to permit its withdrawal therefrom.

In testimony whereof, I affix my signature in the presence of two witnesses.

NORMAN C. BASSETT.

Witnesses:
G. F. DE WEIN,
FRANK E. DENNETT.